(12) United States Patent
Tian

(10) Patent No.: US 9,218,026 B2
(45) Date of Patent: Dec. 22, 2015

(54) ELECTRONIC DEVICE WITH ENGAGEMENT MECHANISM

(71) Applicant: ShenZhen Treasure City Technology Co., LTD., Shenzhen (CN)

(72) Inventor: Le Tian, Shenzhen (CN)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 79 days.

(21) Appl. No.: 14/195,867

(22) Filed: Mar. 4, 2014

(65) Prior Publication Data

US 2015/0156894 A1 Jun. 4, 2015

(30) Foreign Application Priority Data

Nov. 30, 2013 (CN) .......................... 2013 1 06219338

(51) Int. Cl.
 *G06F 1/16* (2006.01)

(52) U.S. Cl.
 CPC .................................. *G06F 1/1637* (2013.01)

(58) Field of Classification Search
 USPC ........... 312/249.12, 234, 223.1, 223.2, 223.3; 248/535, 292.1, 309.1, 371, 162.1, 248/125.2, 441.1, 917, 125.1, 200.1; 349/12, 5, 139, 153; 361/679.01, 361/679.26, 679.27, 679.03, 679.55, 361/679.24, 679.22, 679.56, 679.02, 361/679.07, 679.04, 679.3, 679.09, 679.57, 361/749, 752; 345/32, 555, 174, 690, 207, 345/89, 2.2, 531, 82, 92, 77, 156, 428, 204, 345/214, 613, 581, 589
 See application file for complete search history.

(56) References Cited

U.S. PATENT DOCUMENTS

| | | | |
|---|---|---|---|
| 8,830,669 B2 * | 9/2014 | Sakamoto | 361/679.22 |
| 2008/0237414 A1 * | 10/2008 | Lien et al. | 248/125.2 |
| 2014/0321042 A1 * | 10/2014 | Liu | 361/679.26 |

* cited by examiner

*Primary Examiner* — Hung Duong
(74) *Attorney, Agent, or Firm* — Novak Druce Connolly Bove + Quigg LLP

(57) ABSTRACT

An electronic device includes a housing, a display panel, and engagement mechanisms. The housing includes a plurality of fixing blocks placed on corners. Each fixing block defines a blind hole and two grooves set on opposite sides of the blind hole. The display panel includes a plurality of corners. Corners outwardly extend to form first extending portions. Each extending portion defines a positioning hole. The engagement mechanisms each comprises a connection portion, a positioning post fixed to a first surface of the connection portion facing the display panel and housing, and two springs fixed to the first surface of the connection portion and set on opposite sides of the positioning post. The positioning posts pass through the positioning holes and are received into the blind holes, each spring is pressed by an external force to engage with one of the grooves to fix the display panel to the housing.

6 Claims, 5 Drawing Sheets

ELECTRONIC DEVICE WITH ENGAGEMENT MECHANISM

BACKGROUND

1. Technical Field

The present disclosure relates to electronic devices, and particularly to an electronic device with an engagement mechanism.

2. Description of Related Art

An electronic device includes a display panel and a housing. The display panel is rigidly fixed to the housing by screws. During a transportation process of the electronic device, a surface of the display panel can be easily damaged by the housing when the display panel is pressed against the housing by an external force.

Therefore, there is room for improvement within the art.

DETAILED DESCRIPTION

Figure 1:
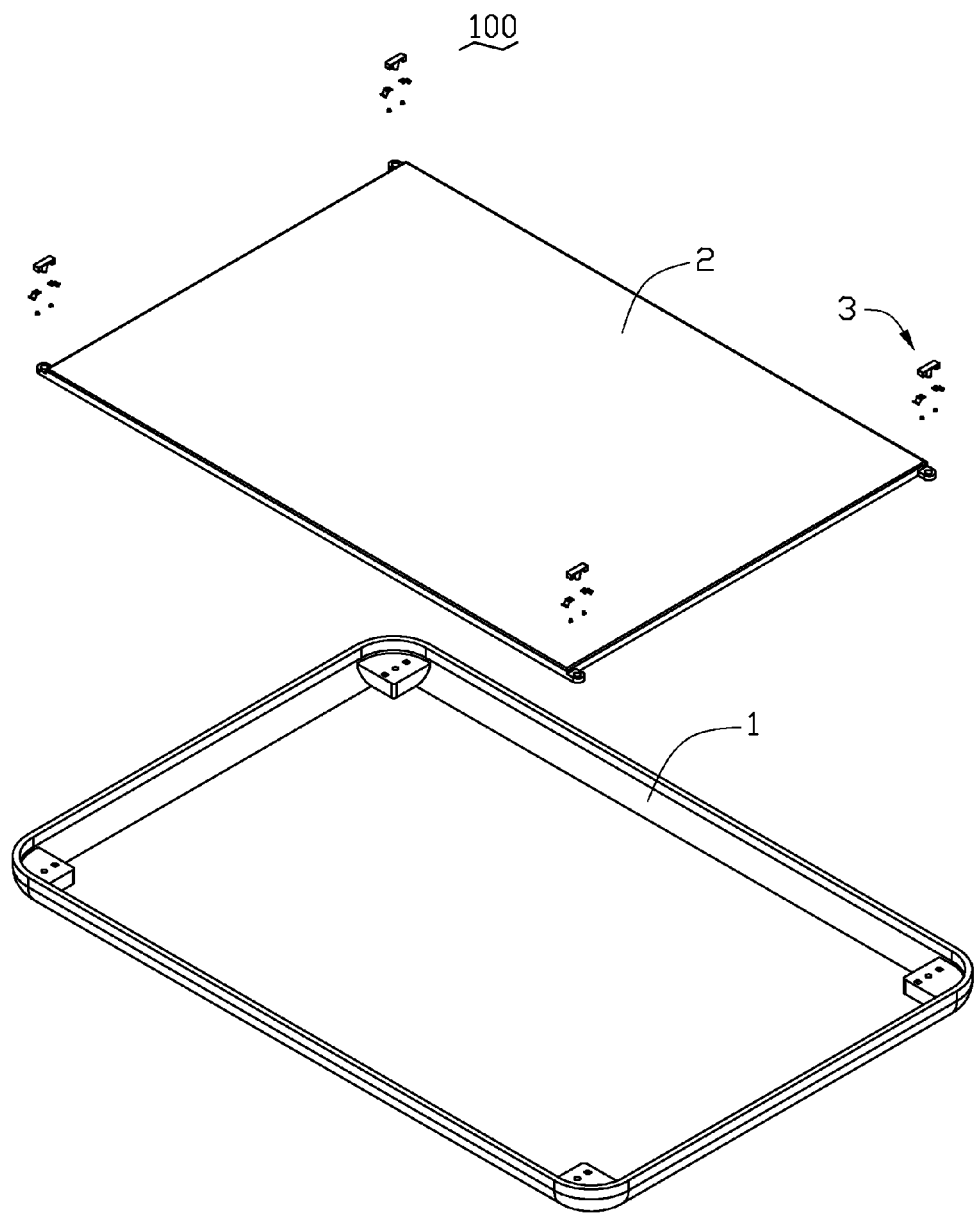
FIG. 1 is an exploded view of an electronic device, in accordance with an exemplary embodiment.
Figure 2:
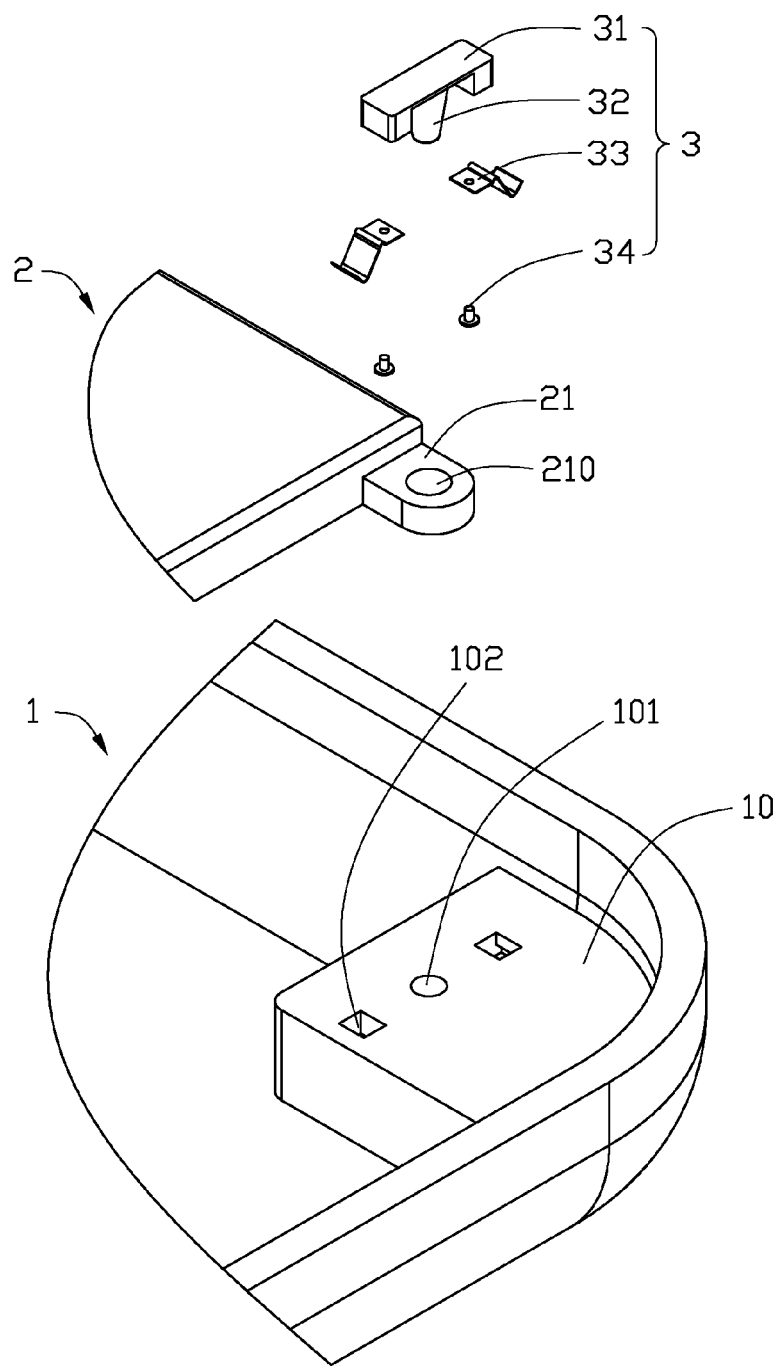
FIG. 2 is a partial exploded view of the electronic device of FIG. 1.
Figure 3:
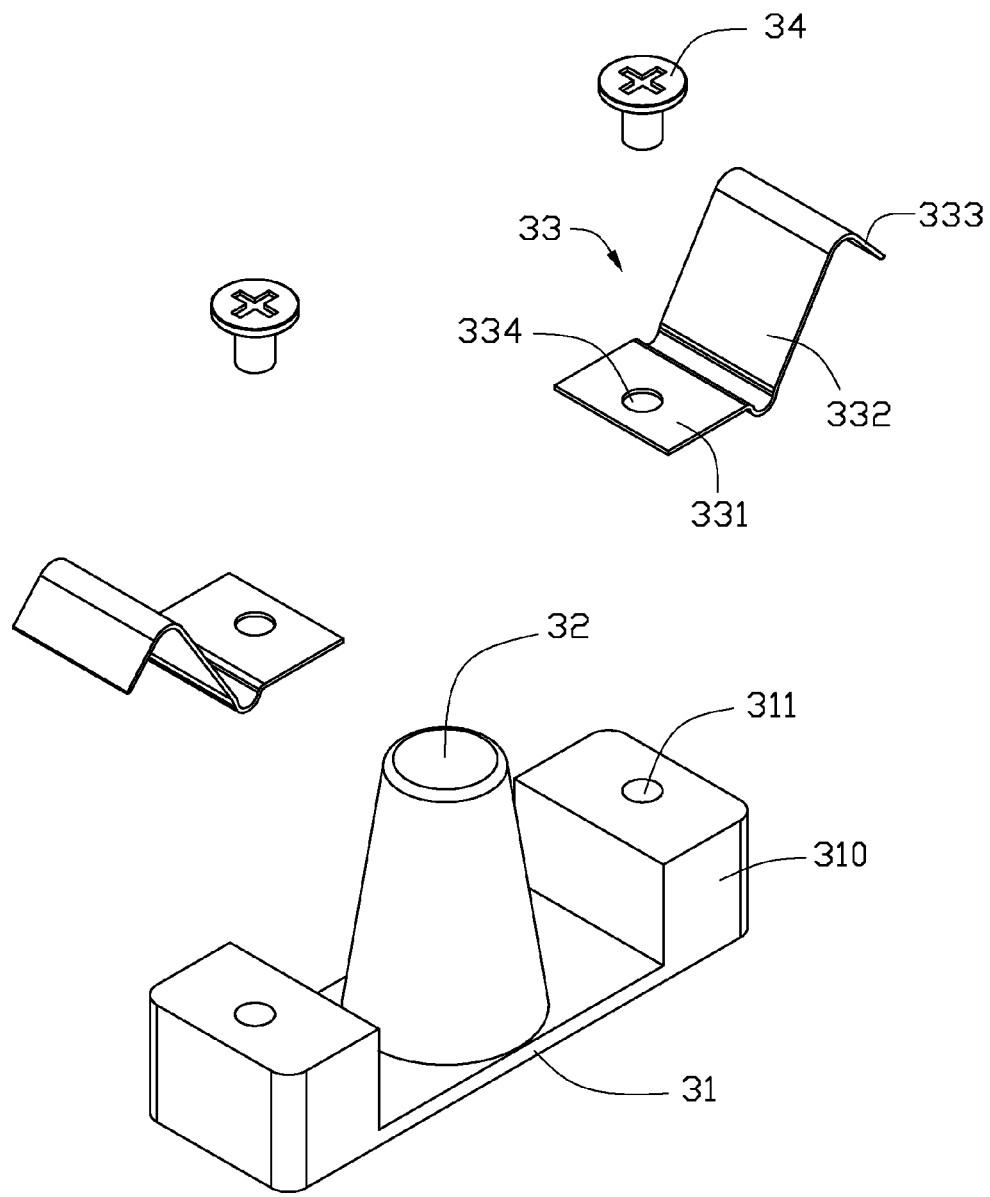
FIG. 3 is an exploded view of an engagement mechanism of the electronic device of FIG. 1.

FIGS. 1-3 show an electronic device 100 of an exemplary embodiment. The electronic device 100 includes a housing 1, a display panel 2, and a plurality of engagement mechanisms 3. The plurality of engagement mechanisms 3 are used to elastically fix the display panel 2 to the housing 1.

A plurality of corners of the display panel 2 extends outwardly to form first extending portions 21. The number of first extending portions 21 is equal to the number of engaging mechanisms 3. Each first extending portion 21 defines a positioning hole 210.

The housing 1 defines a receiving space for placing the display panel 2. The housing 1 includes a plurality of fixing blocks 10 placed near the corners of the receiving space. Each fixing block 10 defines a blind hole 101 aligned with the positioning hole 210 and two grooves 102 set on opposite sides of the blind hole 101. Each groove 102 includes a first recessed portion 103 and a second recessed portion 104 communicating with the first recessed portion 103. In one embodiment, the groove 102 is L shaped (see FIG. 5).

Each engagement mechanism 3 includes a connection portion 31, a positioning post 32 fixed to a first surface of the connection portion 31 facing the display panel and the housing, two springs 33 fixed to the first surface of the connection portion 32, and two screws 34. The two springs 33 are set on opposite sides of the positioning post 32. In one embodiment, the positioning post 32 is a conical frustum. An inside surface of the blind hole 101 matches an outer surface of the positioning post 32, and a diameter of the positioning post 32 gradually reduces along an orientation from the connection portion 31 to the spring 33.

The first surface of the connection portion 31 extends upwardly to form two second extending portions 310 set on opposite sides of the positioning post 32. Each second extending portion 310 defines a threaded hole 311.

Each spring 33 includes a fixing element 331, a hook element 333, and a connection element 332 connecting the fixing element 331 to the hook element 333. Each fixing element 331 defines a through hole 334 aligned with the threaded hole 311. The two screws 34 pass through the two through holes 334 and the two threaded holes 311 to fix the springs 33 to the connection portion 31.

Figure 4:
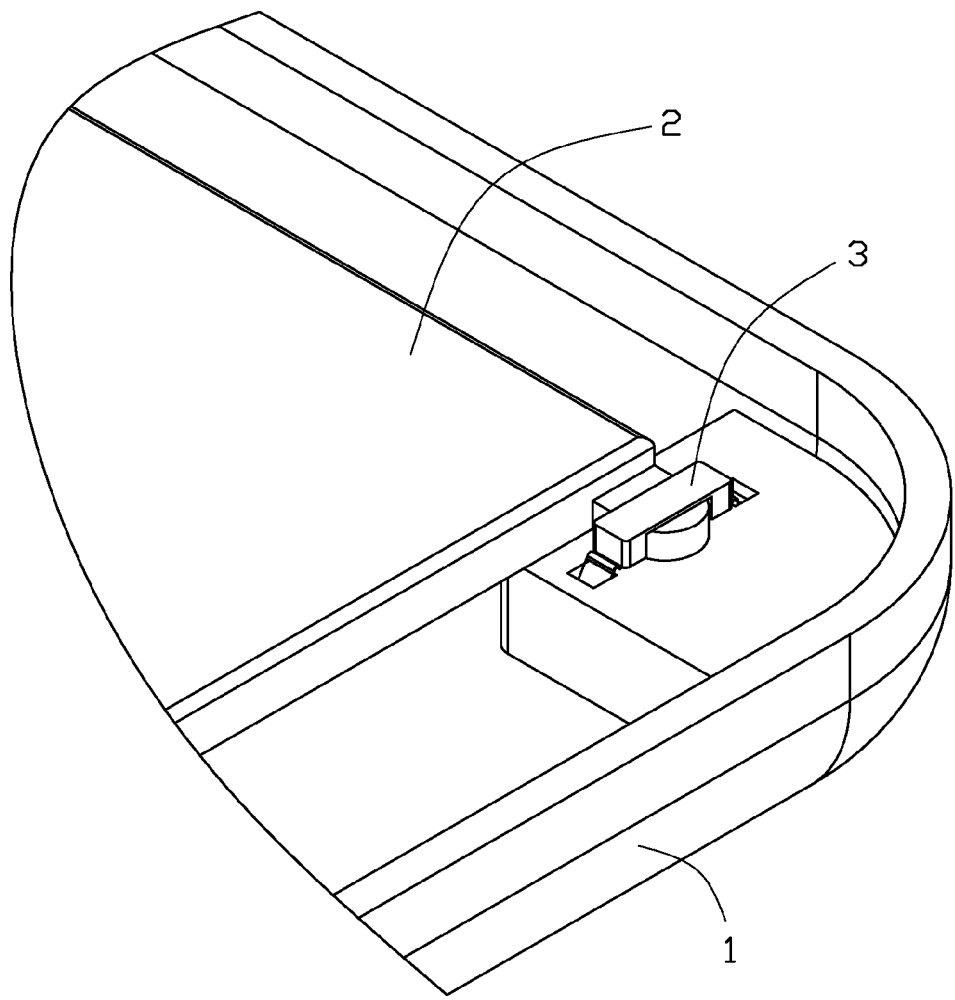
FIG. 4 is a partial isometric view of the electronic device of FIG. 1.
Figure 5:
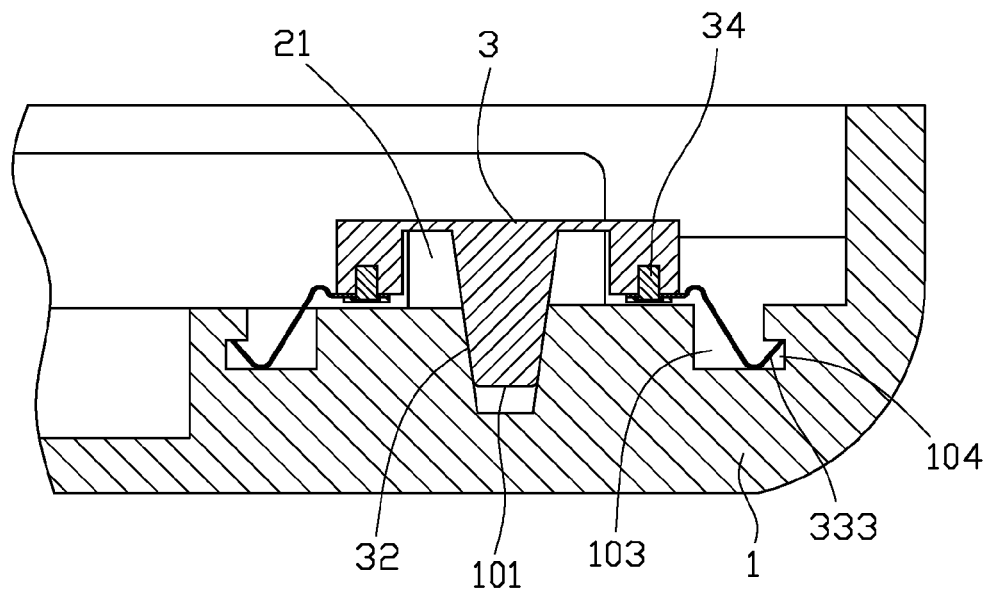
FIG. 5 is a cross-sectional view of the electronic device of FIG. 1.

FIGS. 4-5 show that when fixing the display panel 2 to the housing 1, first, the display panel 2 is placed on the housing 1, and the positioning holes 210 are respectively aligned with the blind holes 101. Second, each positioning post 32 passes through the positioning hole 210 until the positioning post 32 is received into the blind hole 101. Finally, the two springs 33 are pressed by an external force to drive the hook elements 333 to move along the first recessed portion 103 until the hook elements 333 move to the second recessed portion 104 from the first recessed portion 103 and engage with the sidewall of the second recessed portion 104, thereby limiting movement of the hook elements 333 and elastically fixing the display panel 2 to the housing 1.

When removing the display panel 2 from the housing 1, an external force is applied to press the two springs 33 to compress towards each other until the two hook elements 333 separate from the sidewall of the second recessed portion 104, then the engagement mechanisms 3 are moved, and the display panel 2 can be removed from the housing 1 by the user.

Although various embodiments have been specifically described, the disclosure is not to be construed as being limited thereto. Various changes or modifications may be made to the embodiments without departing from the scope and spirit of the disclosure.

What is claimed is:

1. An electronic device comprising:
    a housing comprising a plurality of fixing blocks placed near a plurality of corners of the housing, each fixing block defining a blind hole and two grooves set on opposite sides of the blind hole;
    a display panel comprising a plurality of corner, each corner extending outwardly to form a first extending portion, each first extending portion defining a positioning hole alignable with the blind hole; and
    a plurality of engagement mechanisms, each engagement mechanism comprising a connection portion, a positioning post fixed to a first surface of the connection portion facing the display panel and housing, and two springs fixed to the first surface of the connection portion and set on opposite sides of the positioning post;
    wherein each positioning post passes through one of the positioning holes and is received into one of the blind holes, each of the two springs is pressed by an external force to be engaged with two grooves to fix the display panel to the housing.

2. The electronic device as described in claim 1, wherein each groove comprises a first recessed portion and a second recessed portion communicating with the first recessed portion, each spring comprises a fixing element, a hook element, and a connection element connecting the fixing element to the hook element, the spring is pressed by the external force to drive the hook element to move along the first recessed portion until the hook element is moved to the second recessed portion from the first recessed portion and is engaged with the sidewall of the second recessed portion, thereby fixing the display panel to the housing.

3. The electronic device as described in claim 2, wherein each fixing element defines a through hole, the first surface of the connection portion upwardly extends to form to two second extending portions set on opposite sides of the positioning post, each second extending portion defines a threaded hole aligned with the through hole, each engagement mechanism further comprises two screws, the two screws pass through the two through holes and the two threaded holes to fix the spring to the connection portion.

4. The electronic device as described in claim 1, wherein the positioning post is a conical frustum, and an inside surface of the blind hole matches an outer surface of the positioning post.

5. The electronic device as described in claim 4, wherein a diameter of the positioning post gradually reduces along an orientation from the connection portion to the spring.

6. The electronic device as described in claim 1, wherein the groove is L shaped.

\* \* \* \* \*